United States Patent [19]
Kondo et al.

[11] Patent Number: 5,756,893
[45] Date of Patent: May 26, 1998

[54] THERMAL FLOW METER

[75] Inventors: Minoru Kondo, Chiryu; Hideki Koyama, Okazaki, both of Japan

[73] Assignee: Nippondenso Co., Ltd., Kariya, Japan

[21] Appl. No.: 661,653

[22] Filed: Jun. 11, 1996

[30] Foreign Application Priority Data

Jun. 14, 1995 [JP] Japan .................... 7-147616

[51] Int. Cl.⁶ .................................. G01F 1/68
[52] U.S. Cl. ................................. 73/204.22
[58] Field of Search ............... 73/204.22, 204.26, 73/118.2, 204.24, 204.25

[56] References Cited

U.S. PATENT DOCUMENTS 5,571,964  11/1996  Sawada et al. ............ 73/204.22

FOREIGN PATENT DOCUMENTS 5-209767  8/1993  Japan.
6-265387  9/1994  Japan.

Primary Examiner—Ronald L. Biegel
Assistant Examiner—Jewel V. Artis
Attorney, Agent, or Firm—Cushman Darby & Cushman IP Group of Pillsbury Madison & Sutro LLP

[57] ABSTRACT

A terminal in a thermal flow meter connected to a negative terminal of a power source voltage applied externally has a rectangular-shaped shielding plate extending from the terminal. The terminal is connected to ground as a reference potential of a control circuit constructed in a circuit portion via the shielding plate. The shielding plate covers substantially half of the bottom plate of a circuit case and ribbons are inserted keeping a predetermined space by the shielding plate and the bottom plate. Thus, the bottom plate and the shielding plate can pass external E/M noise or the like to the ground side with improved characteristics of E/M interference resistance and reduced manufacturing costs.

22 Claims, 6 Drawing Sheets

THERMAL FLOW METER

CROSS-REFERENCE TO RELATED APPLICATION

The present application is related to and claims priority from Japanese Patent Application No. Hei. 7-147616, incorporated herein by reference.

BACKGROUND OF THE INVENTION

1. Field of the Invention

The present invention relates to a thermal flow meter, and more specifically to a thermal flow meter having improved characteristics of electromagnetic wave interference resistance.

2. Description of Related Art

As a flow meter measuring the volume of the air taken into an engine installed in a vehicle, a thermal flow meter has been widely known. Since such a thermal flow meter has a functioning portion is disposed in a flow passage of the thermal flow meter integrally with a circuit portion and a sensor portion, it is resistant to the effects of uneven flow and turbulence at the upstream side of the flow passage due to improvements in easy installation in the engine compartment and to its small body size.

However, because a casing containing the functioning portion composed of the circuit portion and the sensor portion in such a thermal flow meter is molded with resin to make it lighter, external electromagnetic waves (hereinafter "E/M waves" or simply "E/M") coming from a cellular phone, a radio or the like, i.e., from outside the thermal flow meter, causes E/M noise to enter the sensor portion, which results in undesirable fluctuations in the output from the sensor portion. A general preventive measure for E/M interference from such external E/M has been performed by letting the incoming E/M escape to ground by inserting a bypass capacitor such as a feedthrough capacitor between a signal wire where the E/M enters and the ground of the circuit portion. To take such E/M interference countermeasures, however, plural bypass capacitors such as feedthrough capacitors or the like have to be added to the circuit portion, which makes the manufacturing processes more complicated and increases manufacturing costs.

To solve the above-described problem, a metal shield pipe is insertedly molded into a resin body to positively contact a metal base between the shield pipe and a driving circuit by a pressuring means having a spring action made of an electrically conductive material in an air flow volume measuring device of a heat generating resistor type as disclosed in Japanese Patent Laid-Open Publication No. Hei 6-265387. The shield pipe electrically connected to the metal base surrounds the circumference of a heat generating resistor and of a temperature sensing resistor fixed at the edge of a supporting pin and also the circumference of the supporting pin, so that external E/M entering the supporting pin, the heat generating resistor and the temperature sensing resistor can escape to the metal base at the ground side.

According to the air flow volume measuring device of a heat generating resistor type disclosed in the aforementioned Japanese Patent Laid-Open Publication No. Hei 6-265387, however, the shield pipe preventing external E/M from entering is disposed separately from the metal base, which raises manufacturing costs due to the increased number of necessary parts. Furthermore, a flange portion is disposed at one end of the shield pipe to conduct electricity to the metal base in this shield pipe. The flange portion has a burring processed portion to press-fit a nut enabling it to fasten to a screw with the metal base. The center of the flange portion forms a concave portion ensuring electrical contact with the metal base. Thus, this shield pipe needs so many portions to be processed that manufacturing costs are increased and the increased number of processing steps of the shield pipe are also increased.

SUMMARY OF THE INVENTION

In light of this problem, the present invention has an object of providing a thermal flow meter having improved characteristics of E/M interference resistance which can be manufactured with reduced manufacturing cost.

A flow meter according to the present invention which solves the aforementioned problem has a cylindrical body having a main passage passing through fluid, a central member located at the center portion of the main passage and having a bypass passage inside, a flow volume detecting portion disposed in the bypass passage, a rib fixed at the cylindrical body and supporting the central member, a circuit portion controlling the flow volume detecting portion, a conductive case fixed at the rib and containing the circuit portion, a terminal supported by the rib and connected to a ground of the circuit portion, a wire connecting portion electrically connecting the flow volume detecting portion to the circuit portion, and an E/M shielding portion wherein the terminal is extended to let external E/M entering the wire connecting portion escape to the ground side of the circuit portion.

Firstly, the E/M shielding portion of the thermal flow meter according to the present invention places the wire connecting portion between the conductive case and the E/M shielding portion.

Secondly, the E/M shielding portion of the thermal flow meter according to the present invention has a cylindrical portion covering the circumference of the wire connecting portion.

Thirdly, the E/M shielding portion and the conductive case of the thermal flow meter according to the present invention are electrically connected to each other at plural portions.

According to the thermal flow meter of the present invention, the terminal connected to the ground of the circuit portion controlling the flow volume detecting portion is extended as the E/M shielding portion to let external E/M entering the wire connecting portion electrically connected to the flow volume detecting portion and the circuit portion escape to the ground side of the circuit portion, so that external E/M entering the wire connecting portion can be definitely suppressed with an easy construction. Thus, because malfunction of the circuit portion caused by external E/M entering the wire connecting portion can be suppressed, characteristics of E/M interference resistance against the external E/M can be effectively improved. Since the external E/M can escape to the ground side of the circuit portion by the E/M shielding portion without inserting a bypass capacitor such as a feedthrough capacitor or the like into the wire connecting portion electrically connecting the flow volume detecting portion to the circuit portion, the number of bypass capacitors such as feedthrough capacitors or the like can be reduced, which lowers manufacturing costs.

According to the thermal flow meter of the present invention, the E/M shielding portion places the wire connecting portion between the conductive case and the E/M shielding portion, so that both the conductive case and the E/M shielding portion can function as E/M shielding bodies. Thus, even if the E/M shielding portion is, for example, manufactured in the shape of a plate, which is a shape that can be processed easily, external E/M entering the wire connecting portion can be suppressed, which reduces processing costs of the E/M shielding portion and also reduces manufacturing costs.

According to the thermal flow meter of the present invention, since the E/M shielding portion has a cylindrical portion covering the circumference of the wire connecting portion, external E/M entering the wire connecting portion of which circumference is covered can be definitely suppressed. Thus, malfunction of the circuit portion caused by external E/M entering the wire connecting portion can be further suppressed, which remarkably improves the characteristics of E/M interference resistance against the external E/M. Compared with the case of forming the terminal, the E/M shielding portion, and the cylindrical portion as individual members, the present invention can reduce the number of parts used by molding the terminal, the E/M shielding portion, and the cylindrical portion integrally by, for example, an extruding molding method or the like. Thus, manufacturing costs can be reduced.

Still further, according to the thermal flow meter of the present invention, electrical connection between the E/M shielding portion and the conductive case at plural portions can reinforce the electrical connection between the E/M shielding portion and the conductive case, which further improves the E/M shielding effect and the characteristics of E/M interference resistance in, for example, the microwave frequency range and above.

Other objects and features of the invention will be appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

A first preferred embodiment of the present invention is hereinafter described with reference to the accompanying drawings.

Figure 1:
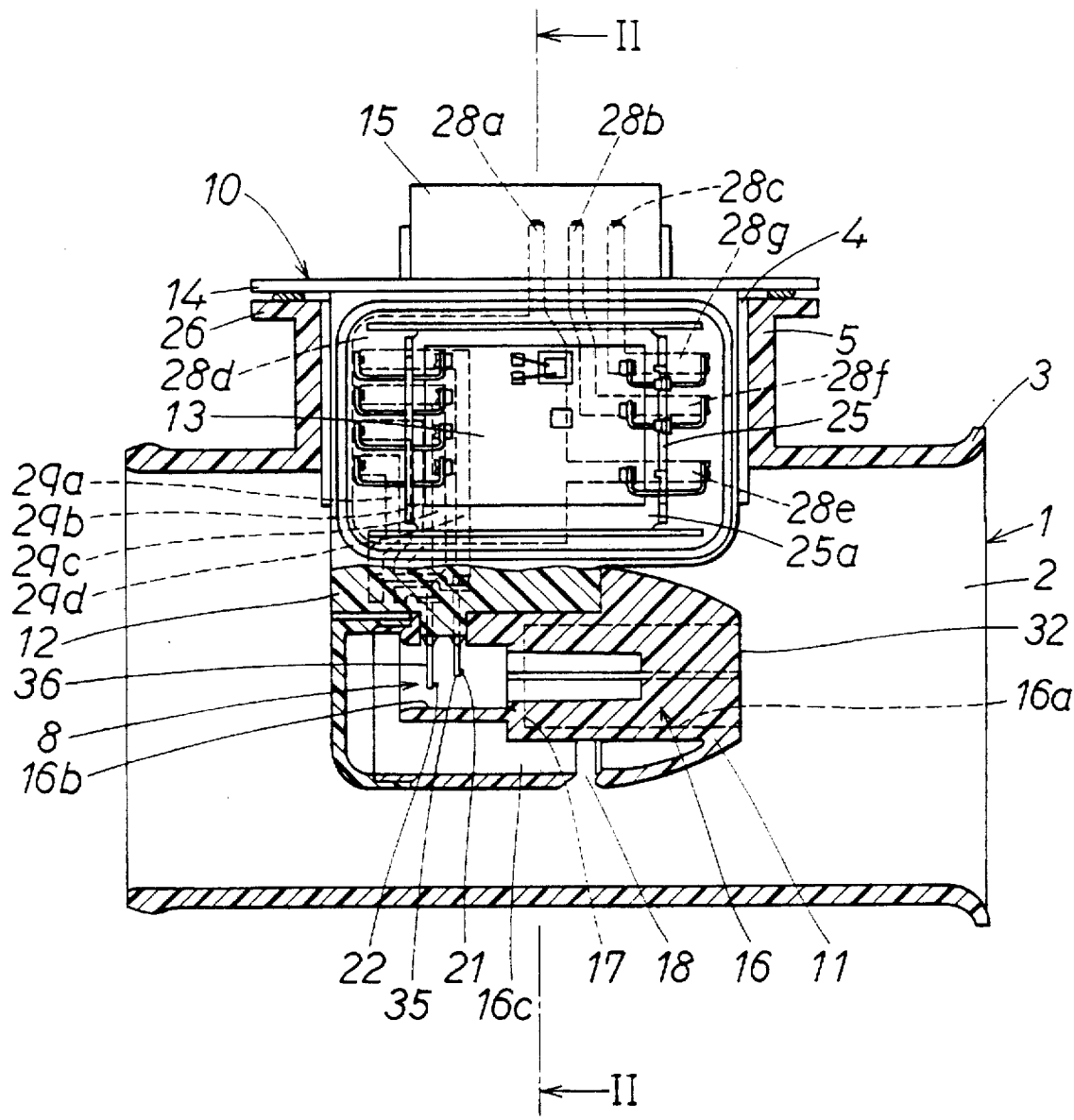
FIG. 1 is a cross-sectional view showing a thermal flow meter according to a first embodiment of the present invention.
Figure 2:
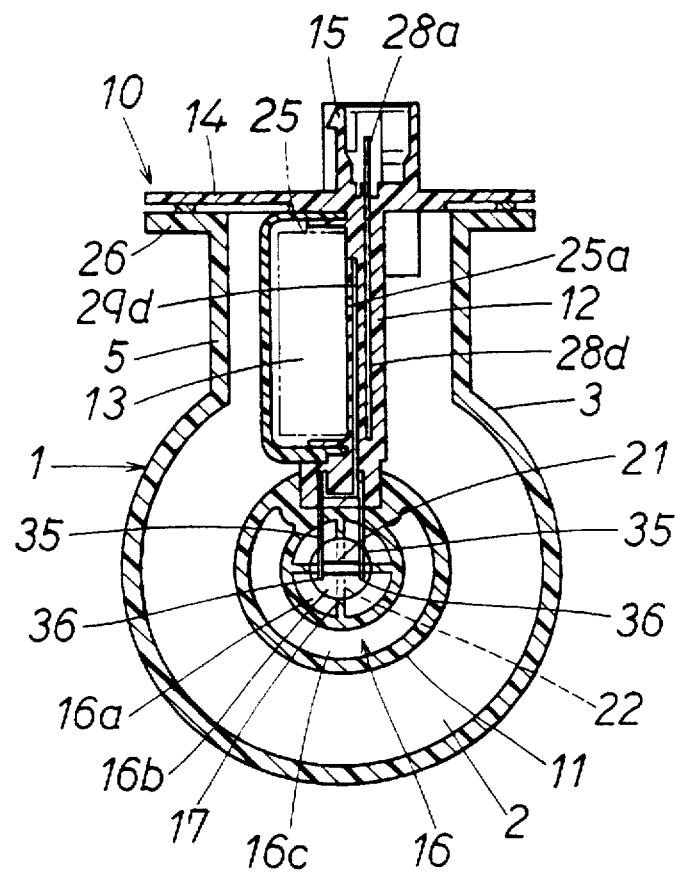
FIG. 2 is a cross-sectional view taken along line II—II of FIG. 1.

The first embodiment according to the present invention is a thermal flow meter measuring the amount of the air taken into an engine and is an example of a flow meter disposed in a duct having an intake air passage formed at the downstream side of an air cleaner element. As shown in FIGS. 1 and 2, a unit 10 consisting a main portion of the thermal flow meter is fixed to the duct.

The duct 1 has a first cylindrical body 3 having a main passage 2 and a second cylindrical body 5 having a hole 4 receiving the unit 10. These first and second cylindrical bodes 3 and 5 are integrally molded using resin.

The unit 10, after being assembled, is fixed to the second cylindrical body 5. The unit 10 includes the following portions of the thermal flow meter: a central member 11 disposed at the center of the main passage 2; a flow volume detecting portion 8 measuring the amount of air flow therethrough; a rib 12 supporting the central member 11 inside the main passage 2; a circuit case 25, made of metal, fixed to the rib 12; a fixing portion 14 fixing the unit 10 to the duct 1; a circuit portion 13 disposed in the circuit case 25 and processing electrical signals generated by the flow volume detecting portion 8; and a mechanical connector portion 15 electrically connecting the circuit portion 13 to external circuitry.

The central member 11 looks like a bullet in its outward appearance, of which an outer diameter gradually enlarges toward the downstream side. The central member 11 is disposed inside the first cylindrical body 3 in order to reduce the cross-sectional area of the main passage 2 formed around the central member 11. A bypass passage 16 formed inside the central member 11 has a large diameter passage 16a at the upstream side, a small passage 16b at the downstream side, and a bump 17 in the middle. The area of the bypass passage at the downstream side formed by the small diameter passage 16b is smaller than the area of the bypass passage at the upstream formed by the larger diameter passage 16a at the upstream side of the bump 17. The bypass passage 16 returns at the downstream side of the flow volume detecting portion 8, and a bypass passage 16c in the cross-sectional shape of a letter C going back to the upstream side after a return forms a bypass outlet portion 18 at the outer peripheral surface of the central member 11 at the upstream side of the flow volume detecting portion 8. The bypass passage 16 and the main passage 2 communicate with each other at the bypass outlet portion 18. The bypass outlet portion 18 opens to almost the entire periphery of the bypass passage 16c except the portion forming the rib 12 as shown in FIG. 2.

The flow volume detecting portion 8 includes a flow speed measuring resistor 21 and a temperature compensating resistor 22, both of which are disposed in the smaller diameter passage 16b and supported by supporting bodies 35 and 36 perpendicularly with respect to the flow direction through the smaller diameter passage 16b.

The rib 12 supports the central member 11 so that the central member 11 can be disposed substantially at the center of the main passage 2. The rib 12 is inserted in the opening direction of the hole 4 of the second cylindrical body 5.

The fixing portion 14 fixes the aforementioned central member 11, the rib 12, the circuit case 25 and the connector portion 15 to the duct 1, and it is fixed to a flange 26 of the second cylindrical body 5 of the duct 3. This means that the central member 11 supported by the rib 12 at the fixing portion 14 can be disposed at substantially the center of the main passage 2 just by fixing the fixing portion 14 of the unit 10 to the second cylindrical body 5. That is, the flow volume detecting portion 8 of the thermal flow meter can be assembled by inserting and fixing the unit 10 into the opening portion of the second cylindrical body 5 formed in the duct 1.

The circuit case 25 in the shape of a parallelepiped, which is made of such conductive material as a metal plate or the like and has a rectangular-shaped bottom plate 25a, contains the circuit portion 13 having a control circuit electrically connected to the flow speed measuring resistor 21 and the temperature compensating resistor 22 and is fixed to the side wall of the rib 12.

The connector portion 15, including fixing terminals 28a–28c electrically connected to the circuit portion 13, is integrally molded with the fixing portion 14 with resin.

The terminals 28a–28c formed in the shape of a ribbon are insertedly molded into the aforementioned rib 12 with ribbons 28e–28g, a shielding plate 28d and ribbons 29a–29d described below.

Figure 3:
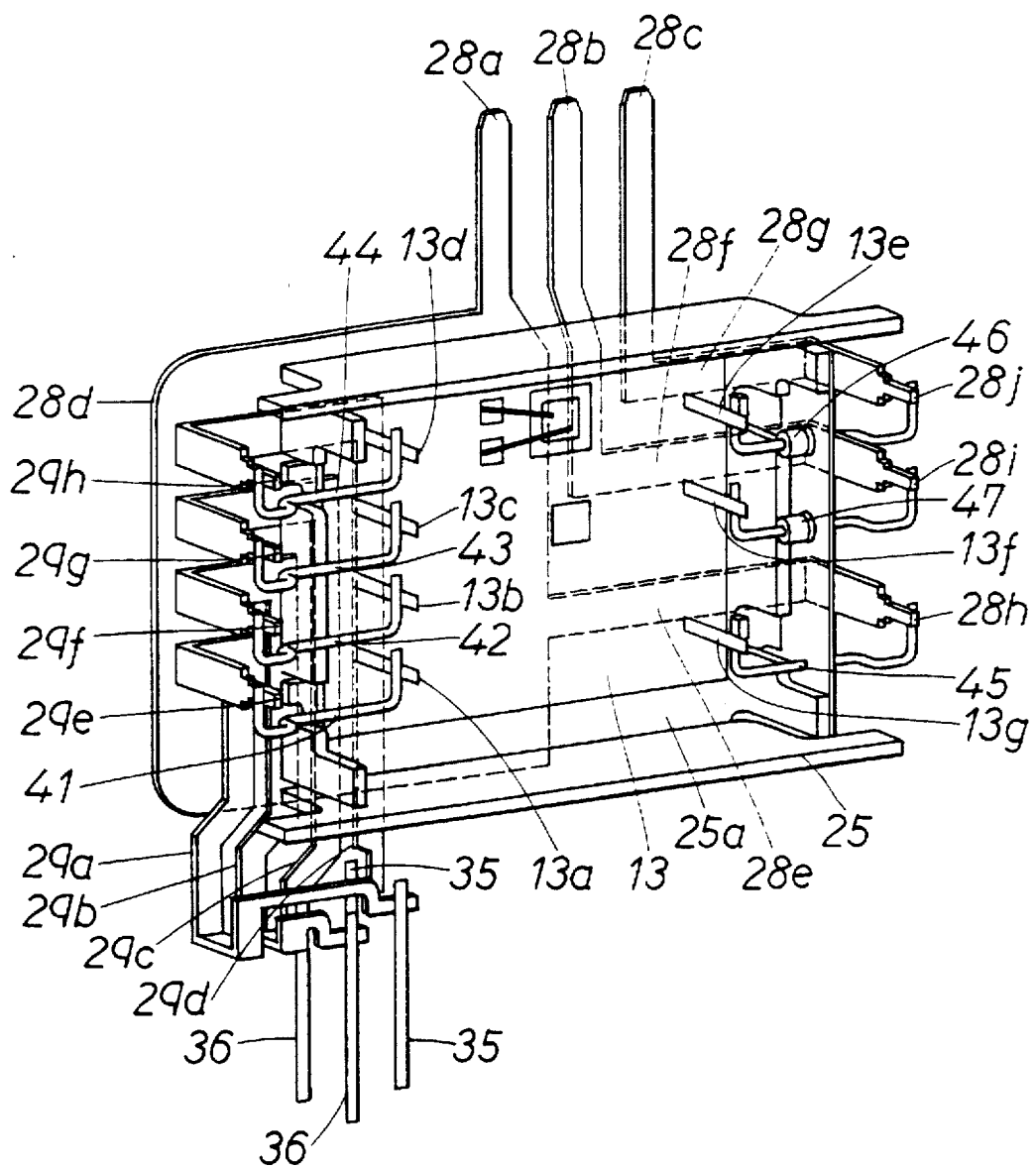
FIG. 3 is a perspective view showing the positional relationship of terminals, ribbons and a circuit case or the like according to the first embodiment.

The following is a detailed explanation based on FIGS. 1–3 about the shapes and the roles of the terminals 28a–28c insertedly molded into the rib 12, the shielding plate 28d, the ribbons 28e–28g and the ribbons 29a–29d.

As shown in FIG. 3, the terminals 28a–28c formed in the shape of a ribbon are located at the same level having a predetermined space from the circuit case 25. The terminal 28a is connected to a negative terminal of a power source voltage applied from the outside, and is also connected to a ground as a reference potential of the control circuit provided in the circuit portion 13 via the ribbon 28e and the shielding plate 28d as described below.

The ribbon 28e is formed extending in the shape of a ribbon in the right direction from the shielding plate 28d which extends below the terminal 28a in FIG. 3.

The shielding plate 28d covers the left half of the bottom plate 25a of the circuit case 25 in FIG. 3. The ribbons 29a–29d are inserted between the shielding plate 28d and the bottom plate 25a while maintaining a predetermined space therebetween. This state can be clearly shown in FIG. 2 which is a cross-sectional view taken along the line II—II of FIG. 1.

The ribbon 28e extending from the shielding plate 28d has an L-shaped end, of which a top has a connecting portion 28h. By soldering a lead wire 45 with the connecting portion 28h, a pin 13g connected to the ground of the control circuit of the circuit portion 13 is electrically connected to the ribbon 28e. Furthermore, the lead wire 45 not only electrically connects the pin 13g to the connecting portion 28h, but is connected to the circuit case 25 by soldering or the like in the middle thereof. Thus, the ground of the control circuit of the circuit portion 13 is electrically connected to the terminal 28a via the pin 13g, the lead wire 45, the ribbon 28e, and the shielding plate 28d.

The terminal 28b extends downward in FIG. 3 in the shape of a ribbon and also has the ribbon 28f extending to the right in FIG. 3 similar to the ribbon 28e. The ribbon 28f has an L-shaped end, of which a top has a connecting portion 28i. One end of a feedthrough capacitor 47 is soldered to the connecting portion 28i and the other end of the feedthrough capacitor 47 is soldered to a pin 13f connected to an output signal wire of the control circuit of the circuit portion 13, which electrically connects the connecting portion 28i to the output signal wire of the control circuit. A ring-shaped metal body of the feedthrough capacitor 47 is inserted into a hole (not shown) formed in the circuit case 25 and its periphery is soldered thereto. Thus, the output signal output from the control circuit can be output to the terminal 28b via the feedthrough capacitor 47 and the ribbon 28f.

The terminal 28c extends downward in the shape of a ribbon in FIG. 3 and also the ribbon 28g extends in the shape of a ribbon to the right in FIG. 3 similar to the ribbon 28b. The ribbon 28g has an L-shaped end, of which a top has a connecting portion 28j. One end of a feedthrough capacitor 46 is soldered to the connecting portion 28j and the other end of the feedthrough capacitor 46 is soldered to a pin 13e connected to an output signal wire of the control circuit of the circuit portion 13, which electrically connects the connecting portion 28j to the output signal wire of the control circuit. Thus, the output signal output from the control circuit can be output to the terminal 28c via the feedthrough capacitor 46 and the ribbon 28g.

By outputting the output signal from the control circuit to the terminals 28b and 28c via the feedthrough capacitors 46 and 47, E/M noise entering the terminals 28b, 28c, and the ribbons 28f and 28g can escape to the circuit case 25 having the same potential as the ground via the feedthrough capacitors 46 and 47.

On one hand, the supporting body 35 connected to the flow speed measuring resistor 21 is electrically connected to the ribbons 29a and 29d, respectively. On the other hand, the supporting body 36 connected to the temperature compensating resistor 22 is electrically connected to the ribbons 29b and 29c, respectively.

The ribbon 29a extending upward in FIG. 3 has an L-shaped end. The top of the end of the ribbon 29a formed in the shape of a letter L has a connecting portion 29e. The connecting portion 29e is connected to the lead wire 41 electrically connected to the pin 13a connected to the control circuit of the circuit portion 13 by soldering or the like.

The ribbon 29b extending upward in FIG. 3 has an L-shaped end similar to the ribbon 29a. The top of the end has a connecting portion 29f. The connecting portion 29f is connected to the lead wire 42 electrically connected to the pin 13b connected to the control circuit of the circuit portion 13 by soldering or the like.

Furthermore, the ribbon 29c has a connecting portion 29g at the top of the L-shaped end similar to the ribbon 29a. The connecting portion 29g and the pin 13c connected to the control circuit are electrically connected by a lead wire 43 soldered to them.

In addition, the ribbon 29d has a connecting portion 29h at the top of the L-shaped end similar to the ribbon 29a. The connecting portion 29h and the pin 13d connected to the control circuit are electrically connected by a lead wire 44 soldered to them.

The above-described ribbons 29a–29d extending upward in FIG. 3 have central portions located in parallel with each other on the same level. Located to keep a predetermined space with the aforementioned shielding plate 28d, the central portions are insertedly molded into the rib 12 made of resin. At the time of insert-molding, a portion of a molding die (not shown) is fixed to predetermined exposed portions of the ribbons 29a–29d and the shielding plate 28d so that the respective central portions of the ribbons 29a–29d and the shielding plate 28d do not contact each other after the insert molding and also can maintain the predetermined spacing.

Because the ends of ribbons 29a–29d extending from the right to the left in FIG. 3 from the respective central portions of the ribbons 29a–29d are respectively formed in the shape of a letter L as described above and are located to go around from the back side to the front side of the circuit case 25, the ribbons 29a–29d are positioned between the bottom plate 25a of the circuit case 25 and the shielding plate 28d even if the pins 13a–13d are located at the left side of the circuit case 25 in FIG. 3. Since the bottom plate 25a of the circuit case 25 is in contact with the surface of the rib 12 formed in the shape of a plate, the bottom plate 25a, the ribbons 29a–29d, and the shielding plate 28d can be positioned in parallel with each other while keeping the predetermined spacing between themselves. The ribbons 29a–29d are located insertedly between the bottom plate 25a and the shielding plate 28d so that most of the E/M coming from the bottom plate 25a and the shielding plate 28d can escape to the ground side even if external E/M comes from a cellular phone, a radio, or the like. That is, the bottom plate 25a and the shielding plate 28b play the roles of E/M shielding bodies and most E/M noise or the like which may enter the ribbons 29a–29d can escape to the ground side of the control circuit, so that E/M noise or the like entering the ribbons 29a–29d can be suppressed. Accordingly, signals from the flow speed measuring resistor 21 and the temperature compensating resistor 22 are hardly influenced by E/M noise or the like, thus, characteristics of E/M interference resistance in the thermal flow meter can be effectively improved.

A modification where the number of electrically connected portions between the shielding plate 28d and the circuit case 25 is increased, is described hereinafter with reference to FIG. 4.

Figure 4:
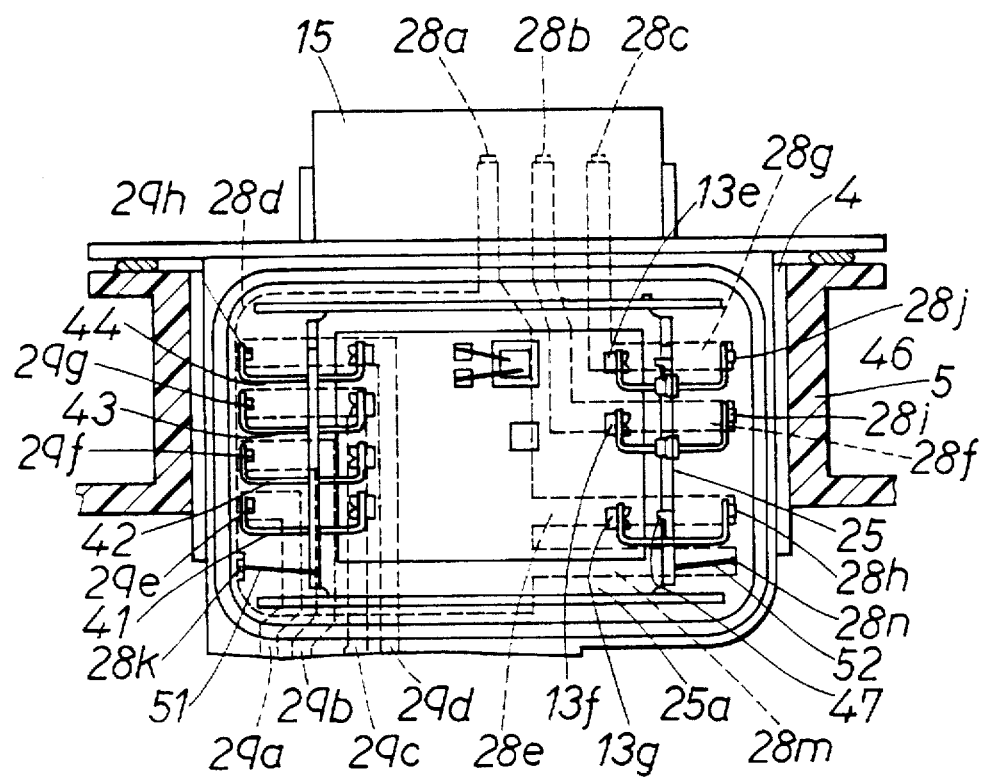
FIG. 4 is an enlarged view showing a main portion of a modification of the first embodiment.

In FIG. 4, a connecting portion 28k and a ribbon 28m are added to the aforementioned shielding plate 28d, as are additional lead wires 51 and 52 electrically connecting the connecting portion 28k and the ribbon 28m to the circuit case 25, respectively.

As shown in FIG. 4, the respective connecting portion 28k and the ribbon 28m are formed around the corners of two places of the shielding plate 28d located the farthest from the terminal 28a. The lead wire 51 electrically connecting the connecting portion 28k to the circuit case 25 is soldered to the connecting portion 28k. On the other hand, the lead wire 52 electrically connecting the ribbon 28m to the circuit case 25 is soldered to a connecting portion 28n located at the top of the ribbon 28m.

Figure 5:
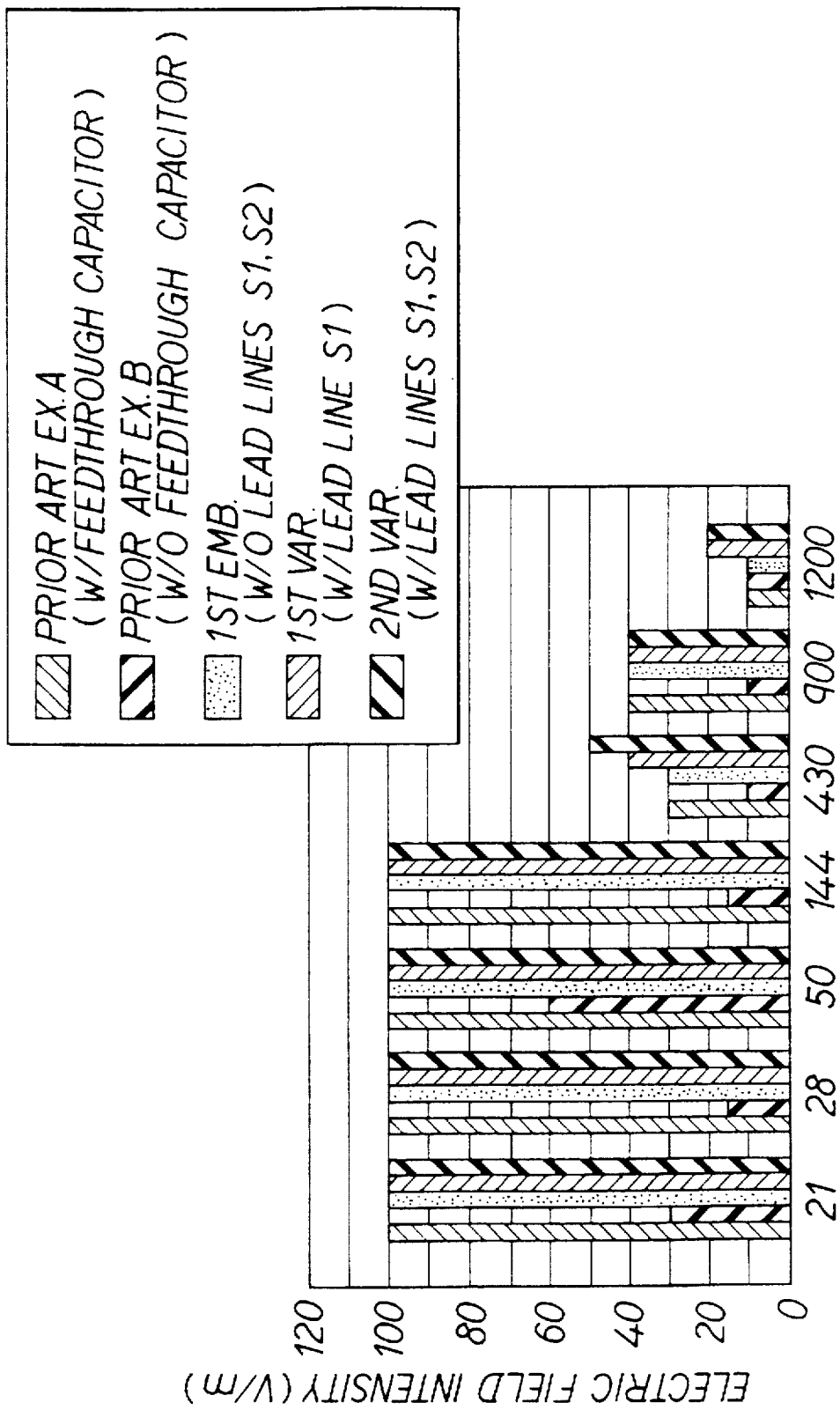
FIG. 5 is a graph of characteristics of E/M interference resistance with respect to incoming E/M frequency.

Thus, by electrically connecting the vicinity of the corners of the two places of the shielding plate 28d to the circuit case 25 at the ground side, high-frequency electrical connection between the shielding plate 28d and the circuit case 25 is reinforced; thus, E/M shielding effects are obviously improved, judging from the characteristic of E/M interference resistance shown in FIG. 5 confirmed in the inventors' experiments.

The characteristics of E/M interference resistance in FIG. 5 shows measurements of frequency and electric field strength when E/M emitted by a signal generating device (not shown) disposed in the vicinity of the thermal flow meter influences a value of measured flow volume. Accordingly, it shows the larger the value of the electric field strength becomes, the better the characteristic of E/M interference resistance becomes.

In this case, a first conventional embodiment represented by the graph elements labeled "PRIOR ART EX. A" in FIG. 5 does not have the aforementioned shielding plate 28d; however, a feedthrough capacitor is used instead of the lead wires 41, 42, 43, and 44. On the other hand, a second conventional second embodiment, whose performance results are represented by the graph elements labeled "PRIOR ART EX. B" in FIG. 5, B does not have the aforementioned shielding plate 29d; however, the above-described lead wires 41, 42, 43, and 44 are used.

A first modified embodiment shown in the graph is an example where only the lead wire 51 is connected, i.e., without using the lead wire 52, out of the lead wires 51 and 52 connected to the shielding plate 28d and the circuit case 25 in the aforementioned modified embodiment. A second modified embodiment shown in the graph shows an example where both the lead wires 51 and 52 connecting the shielding plate 28d to the circuit case 25 in the modified embodiment described the above are employed.

Since the first conventional embodiment includes a feedthrough capacitor instead of the lead wires 41, 42, 43, and 44, it shows a good characteristic of E/M interference resistance, withstanding the strength of an electric field of 100 V/m at frequencies of 21 MHz, 28 MHz, 50 MHz and 144 MHz. However, it is clearly understood that it only withstands the strength of the electric field of 10–40 V/m but shows a deteriorated characteristic of E/M interference resistance at frequencies of 430 MHz, 900 MHz and 1200 MHz. Compared to the other embodiments, the second conventional embodiment not having a feedthrough capacitor but having the lead wires 41, 42, 43, and 44 shows a deteriorated characteristic of E/M interference resistance at frequency such as 21 MHz, 28 MHz, 50 MHz, 144 MHz, 430 MHz, 900 MHz and 1200 MHz.

The thermal flow meter according to the first embodiment can withstand the strength of the electric field of 100 V/m at frequencies of 21 MHz, 28 MHz, 50 MHz and 144 MHz; moreover, it exhibits a better characteristic of E/M interference resistance than the first conventional embodiment using a feedthrough capacitor even at frequencies of 430 MHz, 900 MHz and 1200 MHz. The first and second modified embodiments specifically show characteristics of E/M interference resistance exceeding the conventional embodiment A in frequencies of 430 MHz and 1200 MHz. It is apparent that the strength of the electric field resistance is 40 V/m at a frequency of 430 MHz in the first modified embodiment and the strength of the electric field resistance is 50 V/m in the second modified embodiment, and that both first and second modified embodiments show the strength of the electric field resistance is 20 V/m at the frequency of 1200 MHz. The improved characteristics of the E/M interference resistance in such frequency ranges as microwaves represent the electrical connection between the shielding plate 28d and the circuit case 25 are reinforced from the perspective of high frequency. As for the shielding plate 28d and the circuit case 25, it goes without saying that the E/M shielding effect has been further improved by electrically connecting the vicinity of the corners of the two places of the shielding plate 28d to the circuit case 25 at the ground side.

An effect of the first embodiment is described below.

In FIG. 1, the air introduced by an air cleaner (not shown) installed in the upstream side of the duct 1 is led to the main passage 2 to flow through the main passage 2 from the right to the left direction in FIG. 1. At that time, since the central member 11 throttles the area of the main passage 2, airflow speed through the main passage 2 increases, which generates negative pressure at the bypass outlet portion 18. Flow of the air is generated inside the bypass passage 16 owing to the differential pressure between the negative pressure and the pressure at the bypass inlet portion 32 of the bypass passage 16. The flow speed measuring resistor 21 disposed in the bypass passage 16 is heated by the circuit portion 13 to a fixed temperature difference with respect to the intake air temperature in order to measure the flow of the air in the bypass passage 16. Thus, the intake volume of the intake air can be detected.

Since the bypass inlet portion 32 forming the bypass passage 16 is located at substantially the center of the main passage 2, turbulence of the air flowing through the bypass passage 16 is small compared to the turbulence of the air flowing from the upstream side. Furthermore, since the bypass passage 16 has the bump 17 disposed at the upstream side of the flow volume detecting portion 8, the flow from the upstream can be rectified by being throttled with the bump 17. In addition, the bypass outlet portion 18 opens in the shape of a letter C to substantially the entire periphery of the bypass passage 16 except the portion of the rib 12 with respect to uneven flow from the upstream, and the outer diameter of the central member 11 enlarges gradually toward the downstream side in order to recuperate the uneven flow, so that flowing speed of the bypass passage 16 can be smoothed and should not readily be influenced by the uneven flow from the upstream side.

Even if E/M noise or the like comes from the outside, the incoming E/M noise or the like can escape to the ground side of the control circuit because the ribbons 29a–29d transmitting the detected signal output by the flow speed measuring resistor and the temperature compensating resistor are located between the shielding plate 28d having the same potential as the ground of the control circuit similar to the bottom plate 25a of the circuit case 25 having the same potential as the ground of the control circuit of the circuit portion 13. Accordingly, most E/M noise or the like which may enter the ribbons 29a–29d can escape to the ground side of the control circuit, so that E/M noise or the like entering the ribbons 29a–29d can be suppressed. Thus, the influence caused by E/M noise or the like imposed on the detected signals from the flow speed measuring resistor and the temperature compensating resistor can be kept at a minimum, which improves the characteristics of E/M interference resistance effectively. Compared with the conventional embodiment electrically connecting ribbons 29a–29d to the pins 13a–13d via the feedthrough capacitor, the present embodiment can ensure a better characteristic of E/M interference resistance than the conventional embodiment even if the lead wires 41–44 are employed instead of the feedthrough capacitor, which reduces the number of the feedthrough capacitors used and contributes to lower manufacturing costs.

Furthermore, the characteristics of E/M interference resistance at microwave frequencies can be also improved by electrically connecting the circuit case 25 at the ground side to the vicinity of the corners of the two places of the shielding plate 28d, which can improve the shielding effect of E/M at respective frequencies such as 430 MHz, 900 MHz and 1200 MHz.

Still further, since the shielding plate 28d is formed by extending the terminal 28a, the terminal 28a and the shielding plate 28d can be integrally molded by, for example, extruding one sheet of a steel plate. Thus, the terminal 28a and the shielding plate 28d do not have to be formed as individual members, which reduces the number of parts and manufacturing costs.

A second embodiment according to the present invention is hereinafter described with reference to FIG. 6. The same numerals are used as for components similar to those in the first embodiment.

Figure 6:
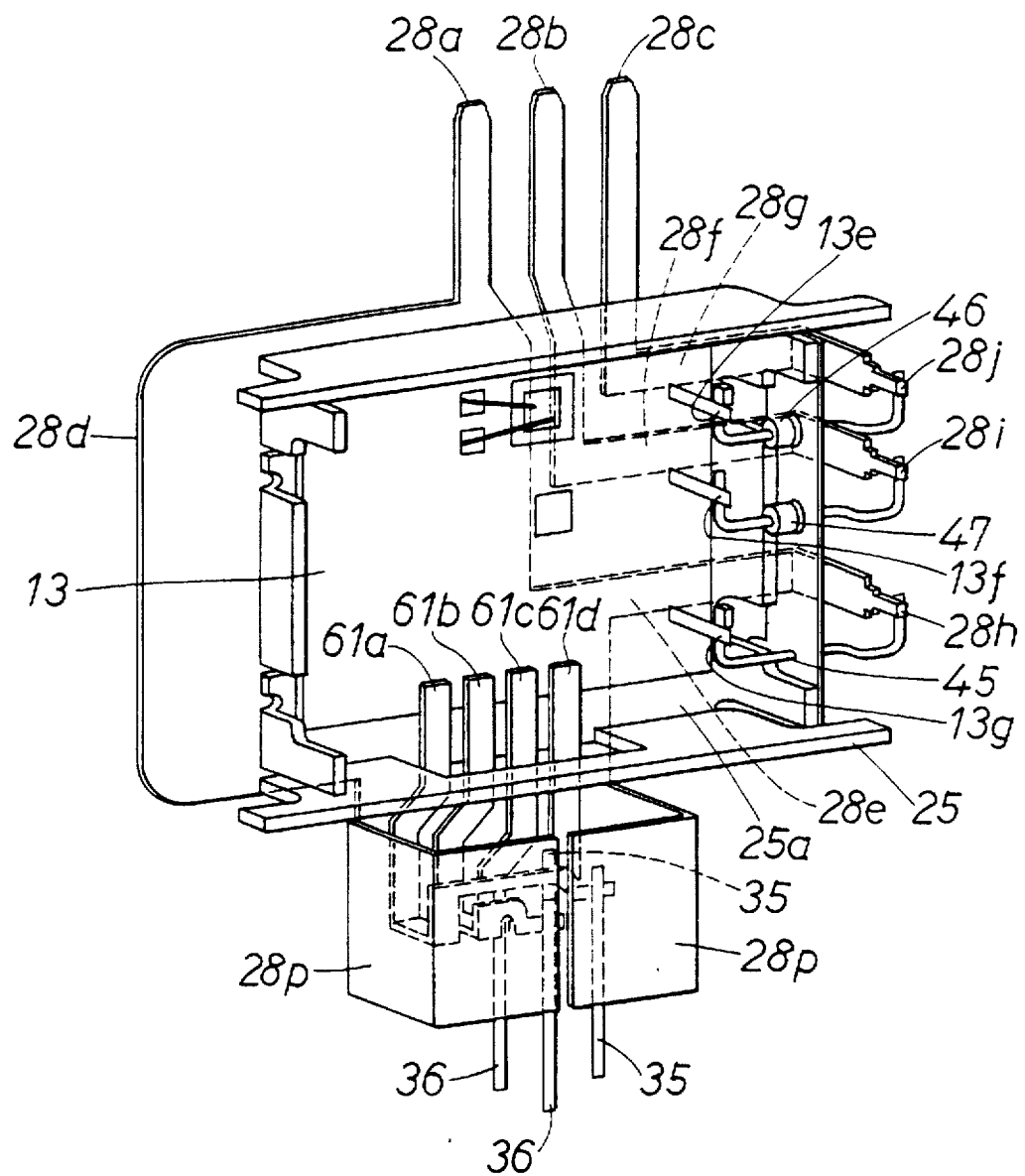
FIG. 6 is a perspective view showing the positional relationship of terminals, a cylindrical portion, ribbons and a circuit case or the like according to a second embodiment of the present invention.

The second embodiment shown in FIG. 6 is an example where the shielding plate 28d formed by extending the terminal 28a downward is further extended downward in the shape of an inverted letter T and a cylindrical portion 28p is formed surrounding the ribbons 61a–61d connected to the circuit portion 13 with the shielding plate in this reversed letter T shape.

Two supporting bodies 35, to which the flow speed measuring resistor (not shown) is fixed, are electrically connected to the respective ribbons 61a and 61b having the same-shaped ends as in the ribbons 29a and 29d explained in the first embodiment by pressure welding or the like.

Similar to the two supporting bodies 35, two supporting bodies 36, to which the temperature compensating resistor (not shown) is fixed, are electrically connected to the respective ribbons 61b and 61c having the same-shaped ends as the ribbons 29b and 29c described in the first embodiment by pressure welding or the like.

The ends of the ribbons 61a and 61d which are not connected to the flow speed measuring resistor and the ends of the ribbons 61b and 61c which are not connected to the temperature compensating resistor are formed extending upward in FIG. 6 and are also electrically connected to a circuit position (not shown) located near a side in the longitudinal direction of the circuit portion 13 by soldering or the like, furthermore, these ribbons 61a–61d are positioned in parallel with each other. The cylindrical portion 28p is disposed around the ribbons 61a–61d positioned in parallel with each other.

As far as the formation of the cylindrical portion 28p is concerned, a side in parallel with the longitudinal side of the circuit portion 13 out of the sides of the shielding plate 28d described in the first embodiment extends in the direction of the ribbons 61a–61d. The cylindrical portion 28p is formed in the shape of a reversed letter C in a developed shape before being formed into a cylindrical shape; then, it is formed by folding both ends of the horizontally long portion of the reversed T shaped-portion into the shape of a square without the left vertical side, so that the ribbons 61a–61d located at the vertically long portion of the developed reversed T shaped portion can be surrounded.

Electrically connected to the shielding plate 28d connected to the ground of the control circuit of the circuit portion 13, the cylindrical portion 28p has the same potential as the ground of the control circuit.

According to the second embodiment, the periphery of the ribbons 61a–61d transmitting the detected signal output by the flow speed measuring resistor and the temperature compensating resistor is surrounded by the cylindrical portion 28p having the same potential as the ground of the control circuit of the circuit portion 13, so that E/M noise or the like coming from the outside can surely escape to the ground side of the control circuit. Thus, because most of the E/M noise or the like which may enter the ribbons 61a–61d can escape to the ground side of the control circuit, the E/M noise or the like entering the ribbons 61a–61d can be suppressed. Therefore an influence of the E/M noise or the like imposed on the detected signals from the flow speed measuring resistor and the temperature compensating resistor can be definitely minimized and also the characteristics of E/M interference resistance of the thermal flow meter can be further effectively improved.

According to the second embodiment, since the cylindrical portion 28p is formed by elongating the shielding plate 28d further which is an extension of the terminal 28a, the terminal 28a, the shielding plate 28d and the cylindrical portion 28p can be integrally molded by extruding, for example, one sheet of a steel plate, which enables the terminal 28a, the shielding plate 28d and the cylindrical portion 28p to be formed integrally. Thus, the terminal 28a, the shielding plate 28d and the cylindrical portion 28p do not have to be formed as individual members, which effectively ensures the reduction of the number of the parts employed and the reduction of manufacturing costs.

By the way, the thermal flow meter according to the present invention can be applied not only to a flow meter measuring the air taken into an engine but also applied to devices other than a thermal flow meter measuring the volume of the air taken into an engine for a vehicle.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the preset invention as defined by the appended claims.

What is claimed is:

1. A flow meter comprising:

a cylindrical body having a main passage for allowing fluid to pass therethrough;

a central member located at a center portion of said main passage and having a bypass passage located therein;

a flow volume detecting portion disposed in said bypass passage for detecting a volume of flow of said fluid through said cylindrical body;

a rib fixed to said cylindrical body and supporting said central member;

a circuit portion electrically connected to said flow volume detecting portion;

a conductive case fixed to said rib and containing said circuit portion;

a terminal supported by said rib and connected to a reference potential side of said circuit portion;

a wire connecting portion electrically connecting said flow volume detecting portion to said circuit portion; and an E/M shielding portion for shielding said circuit portion;

wherein said terminal includes an E/M shielding portion integrally formed thereon, said E/M shielding portion being extended to let external E/M entering in a direction of said wire connecting portion pass to said reference potential side of said circuit portion.

2. A thermal flow meter according to claim 1, wherein said wire connecting portion is between said conductive case and said E/M shielding portion.

3. A thermal flow meter according to claim 1, wherein said E/M shielding portion includes a cylindrical portion covering a circumference of said wire connecting portion.

4. A thermal flow meter according to claim 1, wherein said E/M shielding portion and said conductive case are electrically connected with each other at a plurality of portions.

5. A flow meter measuring a flow volume of fluid, said flow meter comprising:

a detecting portion for detecting said flow volume of said fluid, said detecting portion including a sensor;

a supporting portion, made of resin, supporting said detecting portion in a fluid passage;

a conductive case connected to said supporting portion and containing a driving circuit for driving said sensor to output a flow volume signal;

a conductive member, disposed along said supporting portion, for connecting a reference electrical potential of an external circuit to a reference potential terminal of said driving circuit; and an E/M shielding plate including an extending portion formed by extending a portion of said conductive member.

6. A flow meter according to claim 5, wherein said conductive member has a continuous metal plate including said at least one E/M shielding plate.

7. A flow meter according to claim 6, wherein said conductive member comprises:

a first terminal extending from said E/M shielding plate and electrically disposed at an external circuit side of said conductive member; and a second terminal extending from said E/M shielding plate and electrically disposed at a driving circuit side of said conductive member.

8. A flow meter according to claim 7, wherein:

said first terminal has an external terminal exposed from said supporting portion; and said second terminal has an internal terminal connected to said driving circuit.

9. A flow meter according to claim 5, wherein said conductive member is connected to said conductive case.

10. A flow meter according to claim 5, wherein said conductive case is connected to said reference potential of said external circuit.

11. A flow meter according to claim 10, wherein said E/M shielding plate forms an E/M shield working cooperatively with said conductive case.

12. A flow meter according to claim 11, further comprising:

a connecting member electrically connecting said driving circuit to said sensor;

wherein said E/M shielding plate extends so that at least a portion of said connecting member is located between said E/M shielding plate and said conductive case.

13. A flow meter according to claim 12, wherein:

said E/M shielding plate extends along a bottom plate portion of said conductive case; and said connecting member extends from one side of said conductive case to the other side of said conductive case between said extending portion and said bottom plate portion.

14. A flow meter according to claim 5, further comprising:

a connecting member electrically connecting said driving circuit to said sensor;

wherein said E/M shielding plate surrounds at least a portion of said connecting member.

15. A flow meter according to claim 5, wherein said sensor includes a heat resistor for generating heat.

16. A flow meter according to claim 5, wherein said supporting portion include a fixing portion for fixing on a duct and a rib extending toward an inside of said duct from said fixing portion; and said rib is in a shape of a plate extending in parallel with a flowing direction of said fluid inside said duct.

17. A flow meter according to claim 16, further comprising a duct forming said fluid passage.

18. A flow meter measuring a flow volume of fluid, said meter comprising:

a detecting portion for detecting said flow volume of said fluid, said detecting portion including a sensor;

a supporting portion, made of resin, supporting said detecting portion in a fluid passage;

a conductive case, supported by said supporting portion, containing a driving circuit for driving said sensor, and being for connection to a reference potential; and a shielding plate supported by said supporting portion, said shielding plate being disposed at a predetermined spacing from said conductive case and being for connection to said reference potential;

a conductive member electrically connected to said detecting portion, said conductive member being for conveying an electrical signal; wherein at least a portion of said conductive member and said sensor is disposed between said shielding plate and said conductive case so that said shielding plate and said conductive case cooperatively form an E/M shield working with respect to said conductive member.

19. A flow meter according to claim 18, wherein said conductive member includes a connecting member electrically connecting said driving circuit to said sensor; and at least a portion of said connecting member extends between said shielding plate and said conductive case.

20. A flow meter according to claim 19, further comprising:

an external terminal for providing a connection to an external circuit; and an internal terminal for providing a connection to said driving circuit; wherein said shielding plate, said external terminal and said internal terminal are made of a continuous metal plate to form a member for connecting a reference potential of an external circuit to a reference potential of said driving circuit.

21. A flow meter according to claim 18, wherein said supporting portion includes a fixing portion for fixing a duct and a rib extending toward an inside of said duct from said fixing portion; and said rib is in a shape of a plate extending in parallel with a direction of flow of said fluid inside said duct.

22. A flow meter according to claim 21, further comprising a duct forming said fluid passage.

* * * * *